May 16, 1967 C. COTTIN 3,320,308
PREPARATION OF ALKYL AND DIALKYL CARBAMYL HALIDES
Original Filed Aug. 9, 1963
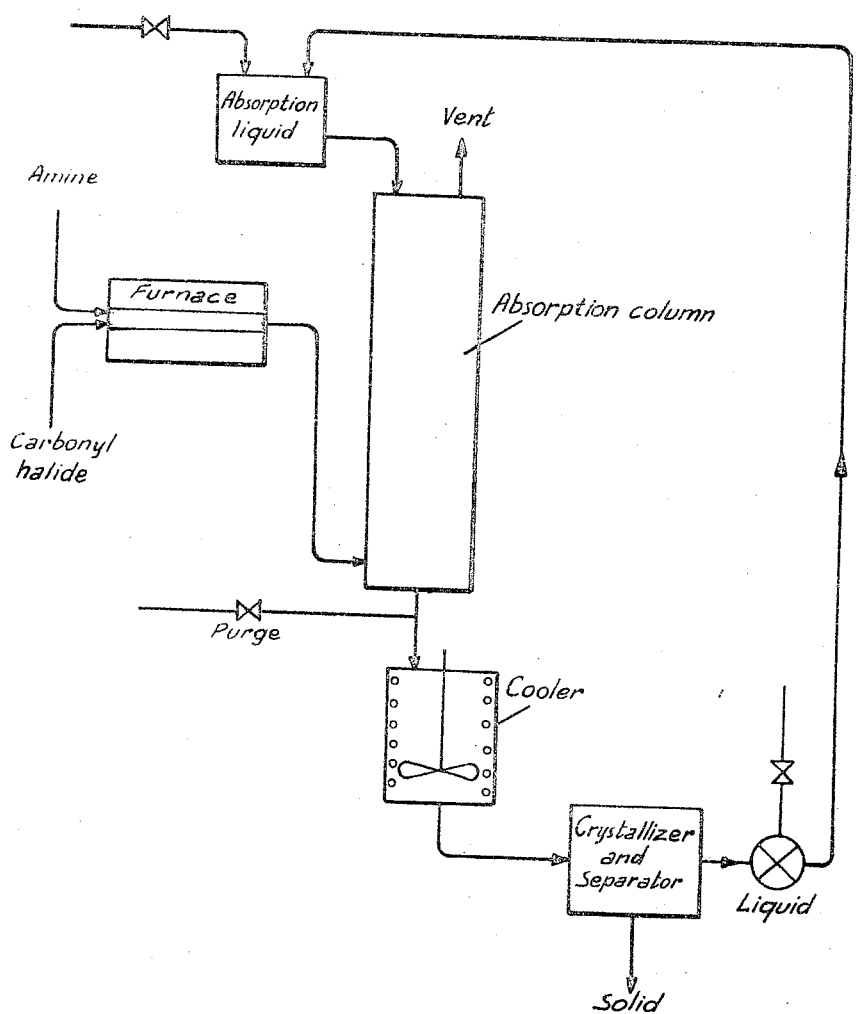
INVENTOR
CAMILLE COTTIN
BY
OSTROLENK, FABER, GERB & SOFFEN
ATTORNEYS

United States Patent Office 3,320,308
Patented May 16, 1967

3,320,308
PREPARATION OF ALKYL AND DIALKYL
CARBAMYL HALIDES
Camille Cottin, Lyon, France, assignor to
Progil, Paris, France
Continuation of application Ser. No. 301,113, Aug. 9,
1963. This application Sept. 8, 1965, Ser. No. 495,006
5 Claims. (Cl. 260—544)

This application is a continuation of copending application Ser. No. 301,113 filed Aug. 9, 1963, now abandoned.

The invention relates to a novel process for the preparation of alkyl or dialkyl carbamyl halides and, particularly, for the continuous preparation of methyl carbamyl chloride, referred to below as MCC.

It is known to produce MCC by the action of phosgene on methylamine or its hydrochloride. In 1887, Gatterman (Ber. 20, 118–1187; Ann. 244, 29–1888) carried out this reaction:

by passing a stream of gaseous phosgene into molten methylamine hydrochloride and condensing the methyl carbamyl chloride which was produced. The velocity of the reaction is low, however, and the yield with respect to $COCl_2$ is poor, because of the slowness of the reaction which makes it necessary to separate, from the hydrogen chloride, the unreacted phosgene and to recycle it.

On the other hand, as the melting point of MCC is high (91° C.), it is necessary in practice to condense the vapor of this material leaving the apparatus at least at this temperature, in order to recover MCC in the liquid state. The boiling point of the product (93° C.) at atmospheric pressure is very close to the melting point, so that the liquid evolved has a high vapor pressure. Considerable losses are caused by entrainment with the evolved gases, that is to say with the excess phosgene and hydrogen chloride formed. The MCC condensed is contaminated with these two compounds. Also leaving the heat of the reactor, the material is thermally unstable and undergoes partial decomposition into methyl isocyanate and hydrogen chloride according to the equilibrium reaction

The isocyanate in turn has a tendency to produce solid insoluble dimers and trimers, which lower the yield and produce blockages in the condensation circuit. Among the chemical and technological disadvantages of the known process, there is also that of condensation of the methylamine hydrochloride entrained by sublimation with the evacuated gases which is supplementary cause of blockage of the circuit mentioned.

The process described by Slocombe (Jour. Am. Sc. Soc., 72, 188, May 1950) consists in passing into a furnace an equimolar gaseous mixture of methylamine and carbonyl chloride to carry out the reaction:

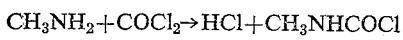

At the outlet from the furnace, the gases obtained are condensed.

In this process, the velocity of reaction is high and the yield better, but does not exceed 88%. However, most of the other disadvantages mentioned above, particularly losses of MCC by entrainment with HCl, contamination of the product desired and thermal decomposition of the MCC after leaving the apparatus, render the process of little value. It may also be mentioned that the very impure MCC obtained by known methods cannot be improved by rectification to the desired purity necessary for various organic syntheses, without substantial supplementary losses.

The present invention has the object of avoiding the aforementioned disadvantages. It allows the preparation of alkyl carbamyl halides and particularly methyl carbamyl chloride, MCC, to be carried out with excellent yields and in a sate of high purity. The new process alone has the advantage of being readily carried out continuously in a suitable manner without accidental interruptions due to blockage of the apparatus or other technological incidents. It can be carried out in a simple apparatus of standard type which is readily manufacturable. Under these conditions, it is simple to carry out the invention to obtain MCC in chemical yields and purities of about 100%.

The process according to the invention consists in passing an axial or dialkylamine with a carbonyl halide in a gaseous mixture through a zone at the temperature required for the condensation reaction of the two reactants and in rapidly cooling the mixture leaving such zone by absorption in a sufficiently cold liquid. The temperature of the liquid is such that no thermal decomposition of the alkyl or dialkyl carbamyl halide formed occurs as it passes into the liquid.

It is to be understood that the liquid employed in carrying out the invention for the absorption and cooling at the outlet from the hot reaction zone is chosen from liquids which are chemically inert to the reaction products.

The temperature in the reaction zone and that of the absorption liquid depend upon the nature of the reactants. The second depends particularly on the sensitivity to thermal decomposition of the carbamyl being prepared. Thus, for the preparation of MCC from methylamine and phosgene, the temperature in the hot zone is preferably adjusted to between 200° and 250° C., or preferably 220° to 240° C. The absorption liquid should be at the most at 90° C., preferably not higher than the ambient temperature. It is particularly advantageous to carry out the rapid cooling with an absorption liquid maintained at between +20° C. and —20° C.

In a particularly practical embodiment of the invention, the cooling and absorption liquid is a solvent for the carbamyl halide manufactured, so that purification by crystallization in the solvent can be carried out. This crystallization takes place in a continuous manner, the liquid separated from the crystals being recycled to the part of the apparatus where the absorption of the products of the reaction occurs. It is understood that the liquid is degased before crystallization of the carbamyl, to eliminate the hydracid formed during the reaction.

It is not always necessary to degas the hydracid and any excess phosgene and to crystallize the carbamyl, because for certain applications the crude solution can be used directly. Whatever the solvent used for rapid cooling and absorption of the reaction product, a pure solvent is not necessary, but it can also contain carbamyl halide, particularly MCC, or be constituted by a mother liquor from crystallization of the product.

Among the solvents which can be used to carry out the novel process are numerous aliphatic and aromatic hydrocarbons, which may be halogenated. These include more or less hydrogenated aromatic hydrocarbons. Use can be made, for example, of products such as petroleum ether, mineral spirit, carbon tetrachloride, dichlorethane, trichlorethylene, benzene, toluene, xylene, chlorobenzene, "Decalin" (decahydronaphthalene) and "Tetralin" (tetrahydronaphthalene), this list not being exhaustive.

When crystallizing the carbamyl halide in its solvent and then drying it, it is desirable to use a light solvent of a higher vapor pressure than that of the carbamyl halide, in order to eliminate the crystals readily without loss through evaporation. This is why the use of carbon tetrachloride, in the case of MCC, is particularly practicable.

According to a variant, the liquid for absorption and rapid cooling can, if required, be constituted by a non-solvent or a poor solvent for the carbamyl being prepared. In this case, it is sufficient to provide at the outlet from the reaction zone known means for obtaining a homogeneous dispersion of the reaction product in the liquid. A suspension of the desired product in place of a solution thus has to be treated, in accordance with this variant.

The preferred composition of the reactant mixture admitted into the reaction zone is 1 mole of alkylamine per mole of carbonyl halide. In particular, the equimolar ratio between methylamine and phosgene is very favorable. A deficit of phosgene leads to a lowering of the yield of MCC with respect to the methylamine, the primary matter which is more costly, and to a side formation of dimethylurea. In contrast, a slight excess of $COCl_2$ is not undesirable. It is useful to make use of ratios of the two reactants which are very close to the theoretical one with, however, a very slight molar excess of phosgene, for example 0.1% to 1%, so that, in industrial operation, an excess of the amine is reliably excluded.

The very simple apparatus for carrying out the process comprises in practice the following element, illustrated in the accompanying drawing. A reactor, usually tubular, comprising a suitable temperature-adjustable furnace; the device for absorbing the vapors leaving the reactor, for example a column with packing, spray nozzles, conical heads or others; an intermediate storage receptacle for the absorption liquid; a purge device for the liquid circuit downstream of the absorption device; vents for removal of the gas; a cooler mounted in the liquid absorption circuit; pumps and valves for continuous operation by circulation of the liquid counter-current to or co-current with the vapors leaving the reactor; if required, a crystallization circuti including means for filtration of the crystals and recycling the mother liquor to the intermediate store. It will be seen that a standard apparatus is employed, which will be well understood to those skilled in the art.

The invention is illustrated by the following non-limiting examples.

*Example 1*

In a reaction system of the type described above, maintained at 220° to 240° C., a gaseous current of methylamine, at the rate of 6.5 moles per hour, and a gaseous current of phosgene, that is carbonyl chloride, adjusted to 6.51 to 6.6 moles per hour were simultaneously introduced. Almost immediately after introduction of the gases into the reactor, methyl carbamyl chloride (MCC) flowed from the reactor to the bottom of the absorption column. The top of the column was provided with a vent for release of hydrogen chloride and was supplied with carbon tetrachloride at a temperature adjusted to 20° C. by preliminary passage through a cooler. The carbon tetrachloride was circulated by an aspirating pump drawing the solvent from a cooled receptacle provided with an agitator located at the bottom of the absorption column. The receptacle received the output from the column. The solvent was recycled permanently while being progressively enriched in MCC.

After previously charging 3.8 kg. of carbon tetrachloride into the receptacle, operation of the apparatus took place over 42 minutes. The MCC content of the solution attained 10% which was shown by infra red spectrographic measurement of the 1760, 1490 and 1190 cm.$^{-1}$ bands.

Then a part of the solution was withdrawn through a branch line connected to the pump. The level of the solution in the receptacle at the bottom of the column was maintained substantially constant by the compensatory continuous introduction of fresh solvent at the head of the column.

After three hours operation, 18.3 kg. of solution containing 1.82 kg. of MCC was recovered. The consumption of methylamine had been 0.61 kg. the yield of MCC being 99%.

*Example 2*

The solution of MCC in carbon tetrachloride obtained as in Example 1 was pumped through a crystallizing cooler maintained at −10° C. and then sent to a filter. The mother liquor from this crystallization of MCC was recycled to the head of the absorption column where the liquor, an MCC solution containing $CCl_4$, partially replaced the fresh solvent necessary.

After three hours of operation of the apparatus with the same yields and temperatures as in Example 1, the weight of crystalline, vacuum-dried, substantially pure MCC was 1.72 kg. As 0.6 kg. of methylamine was used the yield of the pure dried product was 95%, without taking into account the MCC still present in the recycled mother liquor which could be recovered in a subsequent operation.

*Example 3*

In the procedure of Example 1 the methylamine is replaced by dimethylamine. Dimethyl carbamyl chloride is obtained in the same way.

*Example 4*

In the procedure of Example 1 the methylamine is replaced by ethylamine. Ethyl carbamyl chloride is obtained.

*Example 5*

In Example 1 instead of methylamine, diethylamine is used, while the reactor is kept at 230° to 250° C. The top of the column is supplied with trichloroethylene in place of carbon tetrachloride. Diethyl carbamyl chloride is produced.

*Example 6*

Monobutylamine is substituted for the methylamine of Example 1 and the reactor is kept at 240°–250° C. The effluent of the reactor is absorbed in a stream of decalin supplied to the top of the absorption column. Butyl carbamyl is obtained.

*Example 7*

The phosgene, that is carbamyl chloride COCl of Example 1, is replaced by carbamyl bromide $COBr_2$ and its proportion is adjusted to be comprised between 6.51 and 6.53 moles. The effluent flowing from the reactor is absorbed in chlorobenzene. The product obtained is methyl carbamyl bromide.

What is claimed is:

1. In a process for the manufacture of alkyl and dialkyl carbamyl halides, which comprises passing a mixture of substantially equimolar proportions of an amine selected from the group consisting of monoalkylamines and dialkylamines and a carbonyl halide through a heated reaction zone maintained within the range of from 200° to 250° C., and separating the carbamyl halide thus produced from the reaction mixture, the improvement comprising recovering the carbamyl halide product by absorbing the effluent mixture from the reaction zone in an inert liquid maintained at temperatures of no more than 90° C. to rapidly cool said mixture and effect recovery of the carbamyl halide without concomitant decomposition thereof.

2. The process as defined in claim 1, in which said inert liquid is selected from the group consisting of gasoline, white spirit, carbon tetrachloride, dichloroethane, trichloroethylene, benzene, toluene, xylene, chlorobenzene, decahydronaphthalene and tetrahydronaphthalene.

3. The process as defined in claim 1, in which the alkyl radical of said amine has from 1 to 4 carbon atoms, in which the carbonyl halide is phosgene and in which the amine and the phosgene are passed through the reaction zone in the proportion of from 1.001 to 1.01 moles of the phosgene per mole of the amine.

4. The process as defined in claim 1, in which the inert liquid in which the effluent mixture is absorbed is maintained, during the absorption, at temperatures within the range of −20° C. to 20° C.

5. In a process for the manufacture of methyl carbamyl chloride, which comprises passing a mixture of methylamine and phosgene in the proportion of from 1.001 to 1.01 moles phosgene per mole of methylamine through a heated reaction zone maintained within the range of from 200° to 250° C., and separating the methyl carbamyl chloride thus formed from the reaction mixture, the improvement comprising recovering the methyl carbamyl chloride product by absorbing the effluent mixture from the reaction zone in carbon tetrachloride maintained at temperatures within the range of from −20° C. to 20° C. to rapidly cool said mixture and effect crystallization of the methyl carbamyl chloride product without concomitant decomposition thereof.

References Cited by the Examiner
UNITED STATES PATENTS

| | | | |
|---|---|---|---|
| 2,480,088 | 8/1949 | Solcombe et al. | 260—544 |
| 2,732,392 | 1/1956 | Saunders et al. | 260—544 XR |
| 2,762,850 | 9/1956 | Lenz | 260—656 |

LORRAINE A. WEINBERGER, *Primary Examiner.*

RICHARD K. JACKSON, *Assistant Examiner.*